United States Patent [19]
Fan et al.

[11] Patent Number: 5,859,931
[45] Date of Patent: Jan. 12, 1999

[54] IMAGE COMPRESSION AND DECOMPRESSION USING PREDICTIVE CODING AND ERROR DIFFUSION

[75] Inventors: Zhigang Fan, Webster; Ying-wei Lin, Penfield, both of N.Y.

[73] Assignee: Xerox Corporation, Stamford, Conn.

[21] Appl. No.: 653,981

[22] Filed: May 28, 1996

Related U.S. Application Data

[63] Continuation of Ser. No. 332,176, Oct. 31, 1994, abandoned.

[51] Int. Cl.$^6$ ........................................ G06K 9/36
[52] U.S. Cl. ...................... 382/238; 382/232; 382/237; 382/25
[58] Field of Search ................... 382/237, 252, 382/251, 238, 299; 395/112; 358/453

[56] References Cited

U.S. PATENT DOCUMENTS

| | | | |
|---|---|---|---|
| 4,149,194 | 4/1979 | Holladay | 358/283 |
| 4,256,401 | 3/1981 | Fujimura et al. | 355/14 E |
| 4,339,774 | 7/1982 | Temple | 358/283 |
| 4,559,563 | 12/1985 | Joiner, Jr. | 358/430 |
| 4,563,671 | 1/1986 | Lim et al. | 382/56 |
| 4,625,222 | 11/1986 | Bassetti et al. | 346/160 |
| 4,633,327 | 12/1986 | Roetling | 358/283 |
| 4,654,721 | 3/1987 | Goertzel et al. | 358/283 |
| 4,668,995 | 5/1987 | Chen et al. | 382/254 |
| 4,672,463 | 6/1987 | Tomohisa et al. | 358/284 |
| 4,693,593 | 9/1987 | Gerger | 355/14 CH |
| 4,700,229 | 10/1987 | Herrmann et al. | 358/106 |
| 4,706,260 | 11/1987 | Fedele et al. | 382/56 |
| 4,709,250 | 11/1987 | Takeuchi | 346/160 |
| 4,724,461 | 2/1988 | Rushing | 355/14 D |
| 4,760,460 | 7/1988 | Shimotohno | 358/457 |
| 4,809,350 | 2/1989 | Shimoni et al. | 382/56 |
| 4,924,322 | 5/1990 | Kurosawa et al. | 358/448 |
| 4,955,065 | 9/1990 | Ulichney | 382/50 |
| 5,043,809 | 8/1991 | Shikakura et al. | 382/56 |
| 5,045,952 | 9/1991 | Eschbach | 358/447 |
| 5,055,942 | 10/1991 | Levien | 358/456 |
| 5,086,487 | 2/1992 | Katayama et al. | 382/299 |
| 5,095,374 | 3/1992 | Klein et al. | 382/56 |
| 5,226,094 | 7/1993 | Eschbach | 382/252 |
| 5,226,096 | 7/1993 | Fan | 382/50 |
| 5,243,443 | 9/1993 | Eschbach | 358/455 |
| 5,278,670 | 1/1994 | Eschbach | 358/453 |
| 5,282,256 | 1/1994 | Ohzawa et al. | 382/252 |
| 5,289,294 | 2/1994 | Fujisawa | 382/237 |
| 5,309,254 | 5/1994 | Kuwabara et al. | 382/237 |
| 5,309,526 | 5/1994 | Pappas et al. | 382/237 |
| 5,317,411 | 5/1994 | Yoshida | 358/430 |
| 5,321,525 | 6/1994 | Hains | 358/456 |
| 5,323,247 | 6/1994 | Parker et al. | 358/456 |
| 5,325,211 | 6/1994 | Eschbach | 358/466 |
| 5,329,380 | 7/1994 | Ishida | 382/237 |
| 5,351,133 | 9/1994 | Blonstein | 358/453 |
| 5,359,430 | 10/1994 | Zhang | 358/456 |
| 5,448,656 | 9/1995 | Tanaka | 382/252 |
| 5,463,703 | 10/1995 | Lin | 382/251 |
| 5,535,311 | 7/1996 | Zimmerman | 395/112 |

FOREIGN PATENT DOCUMENTS

| | | | |
|---|---|---|---|
| 0 544 511 A3 | 6/1993 | European Pat. Off. | H04N 1/40 |
| 0 606 132 A3 | 7/1994 | European Pat. Off. | H04N 1/40 |

OTHER PUBLICATIONS

Journal of Electronic Imaging, vol. 1, No. 3, Jul. 1992 US, pp. 277–292, Kolpatzik et al., "Optimized Error Diffusion for Image Display", p. 278, col. 2, line 26 – p. 283, col. 1, line 44.

(List continued on next page.)

Primary Examiner—Jose L. Couso
Assistant Examiner—Anh Hong Do
Attorney, Agent, or Firm—Oliff & Berridge, PLC

[57] ABSTRACT

An encoding/compression technique using a combination of predictive coding and run length encoding allows for efficient compression of images produced by error diffusion.

13 Claims, 6 Drawing Sheets

OTHER PUBLICATIONS

Floyd et al., *An Adaptive Algorithm for Spatial Greyscale,* Proceedings of the SID, 17/2, pp. 75–77 (1976).

Jarvis et al., *A Survey of Techniques for the Display of Continuous Tone Pictures on Bilevel Displays,* Computer Graphics and Image Processing, vol. 5, pp. 13–40 (1976).

Stucki, *Mecca—A Multiple–Error Correction Computation Algorithm for Bi–level Image Hardcopy Reproduction,* IBM Research RZ1060 (1981).

Goertzel et al., *Digital Halftoning on the IBM 4250 Printer,* IBM J Res Develop vol. 31, No. 1, pp. 2–15, Jan. 1987.

Holladay, *An Optimum Algorithm for Halftone Generation for Displays and Hard Copies,* Proceedings of the SID, vol. 21/2, 1980, pp. 185–192.

Roetling, *Halftone Method with Edge Enhancement and Moire Suppression,* J. Opt. Soc. Am., vol. 66, No. 10, Oct. 1976, pp. 985–989.

IMAGE COMPRESSION AND DECOMPRESSION USING PREDICTIVE CODING AND ERROR DIFFUSION

This is a continuation of application Ser. No. 08/332,176 filed Oct. 31, 1994, now abandoned.

BACKGROUND OF THE INVENTION

1. Field of the Invention

This invention relates to a lossless compression technique and an apparatus in which an image produced by error diffusion is predictively run length encoded and decoded.

2. Discussion of Related Art

Data compression systems have been used to reduce costs associated with storing and communicating image data. However, conventional compression methods yield very little compression when the input image is halftoned by error diffusion. Error diffusion is an important technique for digital halftoning. It usually generates images with superior quality. Due to irregular, high frequency noise patterns introduced in the process, it is very difficult to compress error diffused images. For example, conventional run length based techniques, such as CCITT Group3 and Group4 formats used in facsimile operations, are inappropriate for compressing error diffused images since they cannot suitably handle short run lengths which are dominant in error diffused images.

SUMMARY OF THE INVENTION

It is therefore an object of this invention to compress an error diffused image without losing image information.

It is another object of this invention to use a predictive coding technique for the lossless compression of error diffused images.

It is still another object of this invention to predictively code an error diffused image using run length encoding to realize lossless image compression.

It is still a further object of this invention to predictively code and decode an original error diffused image using run length encoding/decoding.

To achieve these and other objects, the inventive method and apparatus predictively code error diffused images into run length encoded error signals which can be transmitted or otherwise sent to a complimentary receiver/decoder.

BRIEF DESCRIPTION OF THE DRAWINGS

These and other aspects of the invention will become apparent from the following descriptions which illustrate a preferred embodiment of the invention when read in conjunction with the accompanying drawings in which.

DETAILED DESCRIPTION OF PREFERRED EMBODIMENTS

Unless otherwise indicated, the term "signal" is used interchangeably herein to mean both an individual signal and a multicomponent signal having numerous individual signals.

Figure 1:
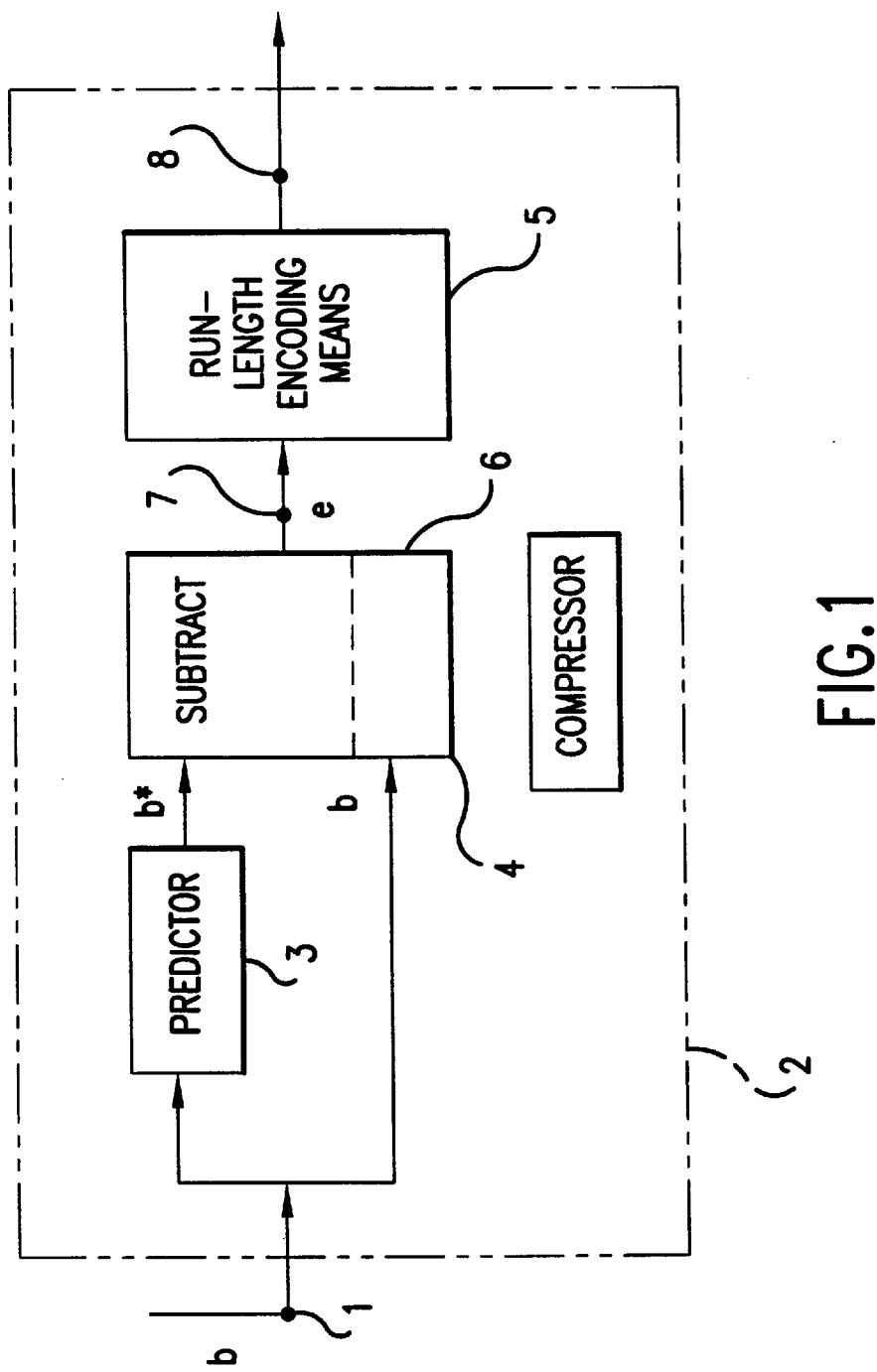
FIG. 1 shows a block diagram of an illustrative apparatus using an inventive compression method of an embodiment of the invention.

A basic system for carrying out the compressive method of the present invention is shown in FIG. 1. As shown, an image produced by error diffusion is received as the input of a compressor 2 at point 1. The image comprises a plurality of signals b(m,n) (hereafter "b"), which is typically, 1 or 2 bits per pixel. The compressor 2 comprises prediction circuitry 3 such as a predictor, comparison circuitry or subtraction circuitry 4 and a run length encoding means or encoder 5. The compressor 2 also includes as a part of the subtraction circuitry 4, circuitry for generating a plurality of prediction errors 6 based on the results derived by the subtraction circuitry 4. The signal b is input into the predictor 3 and also into the subtraction circuitry 4. The predictor 3 generates a predicted signal, b* (m,n) (hereafter "b*") based on stored values of previous quantization errors, e*(m−i, n−j), and an average of previous signals b(m−i, n−j). The signal b, and predicted signal b*, are input into the subtraction circuitry 4. This circuitry generates a plurality of prediction errors, E(m,n) (hereinafter "E"), by comparing the predicted image to the error diffused image. Prediction errors are determined by subtracting the predicted image from the error diffused image.

Prediction errors are output at point 7 and input into a run length encoder 5. In this manner, only the differences or errors between an error diffused signal or image and a predicted image is transmitted to point 8.

Figure 2A:
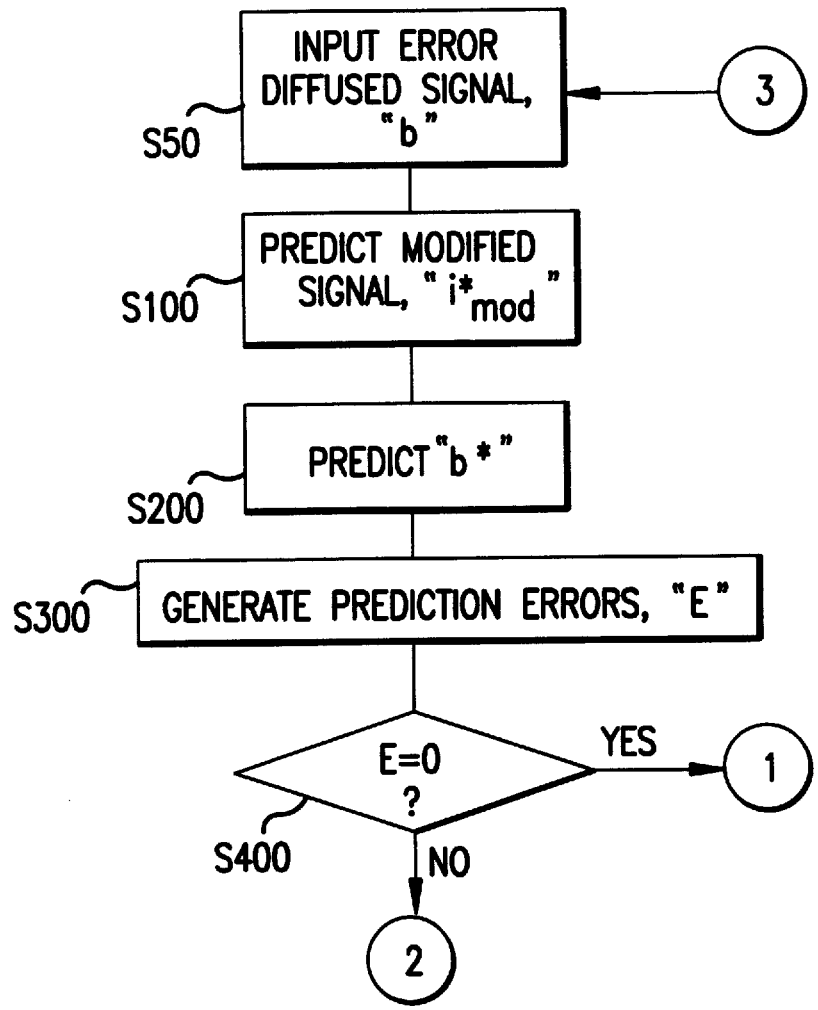
FIGS. 2(A) and (B) are flow charts relating to an illustrative compression method of an embodiment of the invention.
Figure 2B:
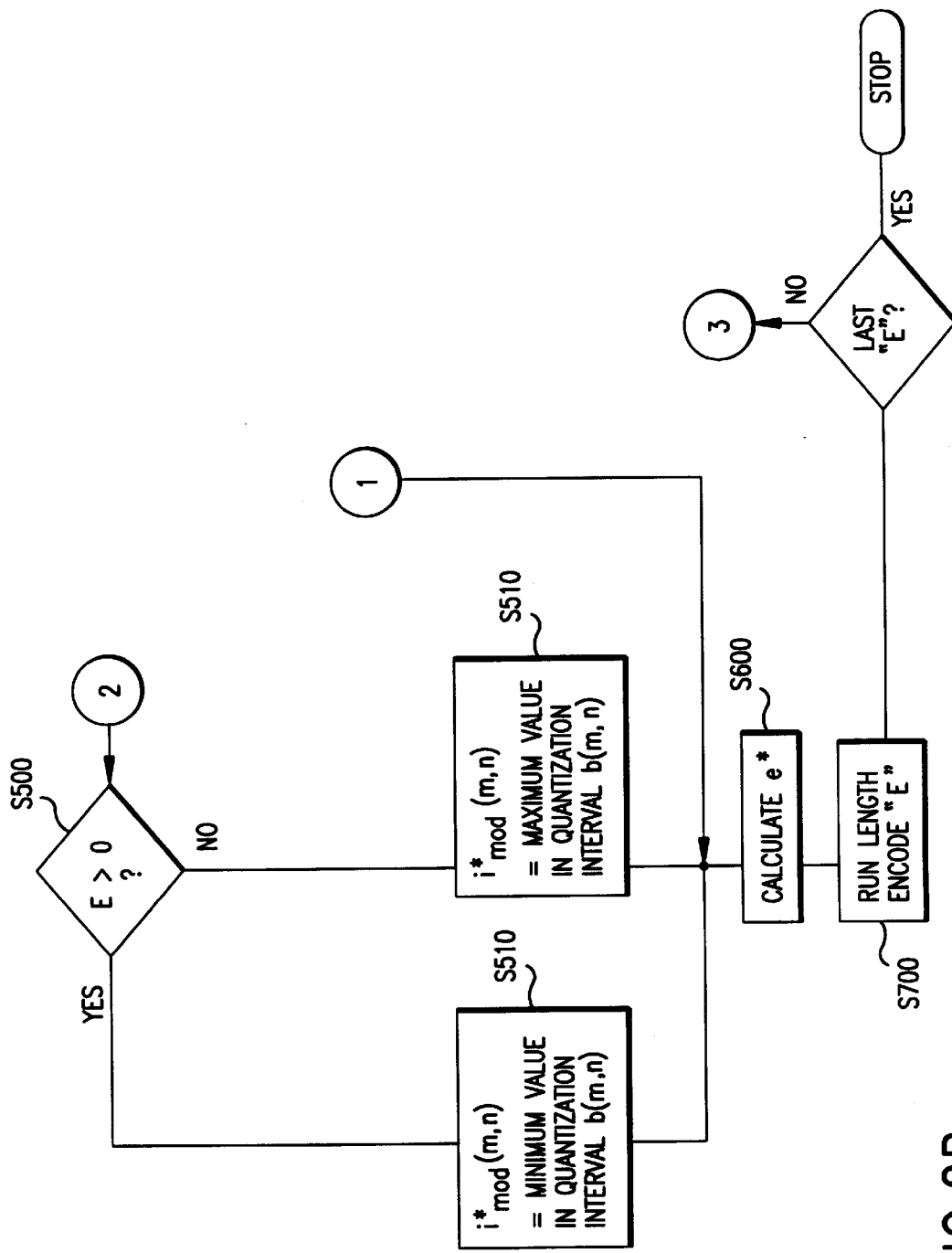

FIGS. 2(A) and (B) are flow charts showing the operation of the compressor 2 shown in FIG. 1. Initially, an error diffused signal, b, is input into the compressor 2 at step S50. At step S100 a predicted, modified signal $i^*_{mod}(m,n)$ (hereinafter "$i^*_{mod}$"), is calculated in the predictor 3 according to the following equation:

$$i^*_{mod}(m,n) = i^*(m,n) + \Sigma a(i,j) e^*(m-i, n-j) \quad (1)$$

where the * denotes an estimation or prediction and a(i,j) denotes weights used in error diffusion.

The two values on the right side of equation (1) represent an average for previous error diffused signals for a set of past pixels and a weighted summation of previous quantization errors, respectively. Both values are stored in a memory or storage (not shown in FIG. 1) which may be a part of, or separate from, the compressor 2.

The predicted, modified signal or predicted continuous tone signal i* mod (m, n) is a continuous tone signal because it is based upon an average of previous error diffused halftone digital signals i* (m, n) which is a continuous tone signal. This average is a continuous tone signal because it is an average of previous error-diffused signals. Thus, even though each individual previous error-diffused signal is digital the average of these signals will produce a value that falls between the thresholds of the error-diffused signal and, therefore, is a continuous tone signal.

The predicted continuous tone signal i* mod is also a continuous tone signal because it is also based upon a weighted average of previous prediction error signals which is based upon previous predicted continuous tone signals as will be explained below in connection with Eq. (5).

Once the predicted, modified signal $i^*_{mod}$ is determined, the next step is to predict b* from a quantized value of $i^*_{mod}$ at step S200. Mathematically the predicted signal b* is calculated as follows:

$$b^*(m,n) = Q[i^*_{mod}(m,n)] \quad (2)$$

where Q is the quantization operation.

In this manner the error diffused signal is predicted as b*. Because b* is a prediction of an error diffused halftone digital signal it is known as the predicted error diffused halftone digital signal.

Once b* is known, the prediction error E can be calculated using the equation:

$$E(m,n)=b(m,n)-b^*(m,n). \qquad (3)$$

The prediction error is calculated in the comparison circuitry 4 by subtracting the predicted image from the error diffused image. Such a comparison results in a plurality of prediction errors being generated by comparison circuitry 4 at step S300. If during such comparisons a prediction error E is determined to be zero, then the predictor 3 has predicted a correct signal. In such a case there is no need to adjust $i^*_{mod}$.

On the other hand, if during such comparisons E≠0, then $i^*_{mod}$ must be adjusted in step 510 in one of two ways. If:

$$i^*_{mod}=\text{minimum value in a quantization interval of } b(m,n), \text{ if } E(m,n)>0; \qquad 4(a)$$

or $$i^*_{mod}=\text{maximum value in a quantization interval of } b(m,n), \text{ if } E(m,n)<0. \qquad 4(b)$$

For example, if 0.5 is used as a threshold for quantization then a "minimum" value corresponding to equation 4(a) would be a value greater than 0.5 e.g., 0.51 (b=1 in this case and the quantization internal is any value greater than 0.5). Likewise, a "maximum" value would be a value less than 0.5, e.g., 0.49 (b=0 in this case, and the quantization interval is any value less than 0.5).

The actual adjustment is carried out by adjustment circuitry which may be a part of the predictor 3.

In either equation 4(a) or (b) a new, predicted quantization error, e*(m,n) (hereafter "e*") must eventually be calculated and stored in the predictor 3 at step S600. This quantization error is calculated using the following formula:

$$e^*(m,n)=i^*_{mod}(m,n)-b(m,n). \qquad (5)$$

As can be seen from equation (5) a present predicted quantization error, e*, is derived from a predicted, modified signal, $i^*_{mod}$, and b. This present quantization error is then stored in memory in order to calculate a new, predicted modified signal when the next error diffused signal is input into the predictor 3.

After the prediction errors are generated they are output to point 7 and eventually input into a run length encoder 5.

Typically, error diffused signals have short "run lengths." A run length is defined as a group of continuously coded pixels, i.e. 10 white pixels represented by binary 1s in a row. The use of predictor 3 increases the run length of error diffused signals.

The use of a run length encoder 5 allows these "lengthened" run lengths to be transmitted or otherwise output using a code which identifies, in this instance 10 "non-errors" (as opposed to 10 white pixels) in a row by, for instance "10x" (where x=error) instead of transmitting each of the 10 "non-errors" individually, i.e., 1x, 1x, 1x . . . etc. Thus, it can be seen that in the event there are no errors generated, a continuous stream of "no errors" is input into the run length encoder 5. This continuous stream can be encoded by the run length encoder 5 and output to point 8 as one code indicating "no errors."

Figure 3:
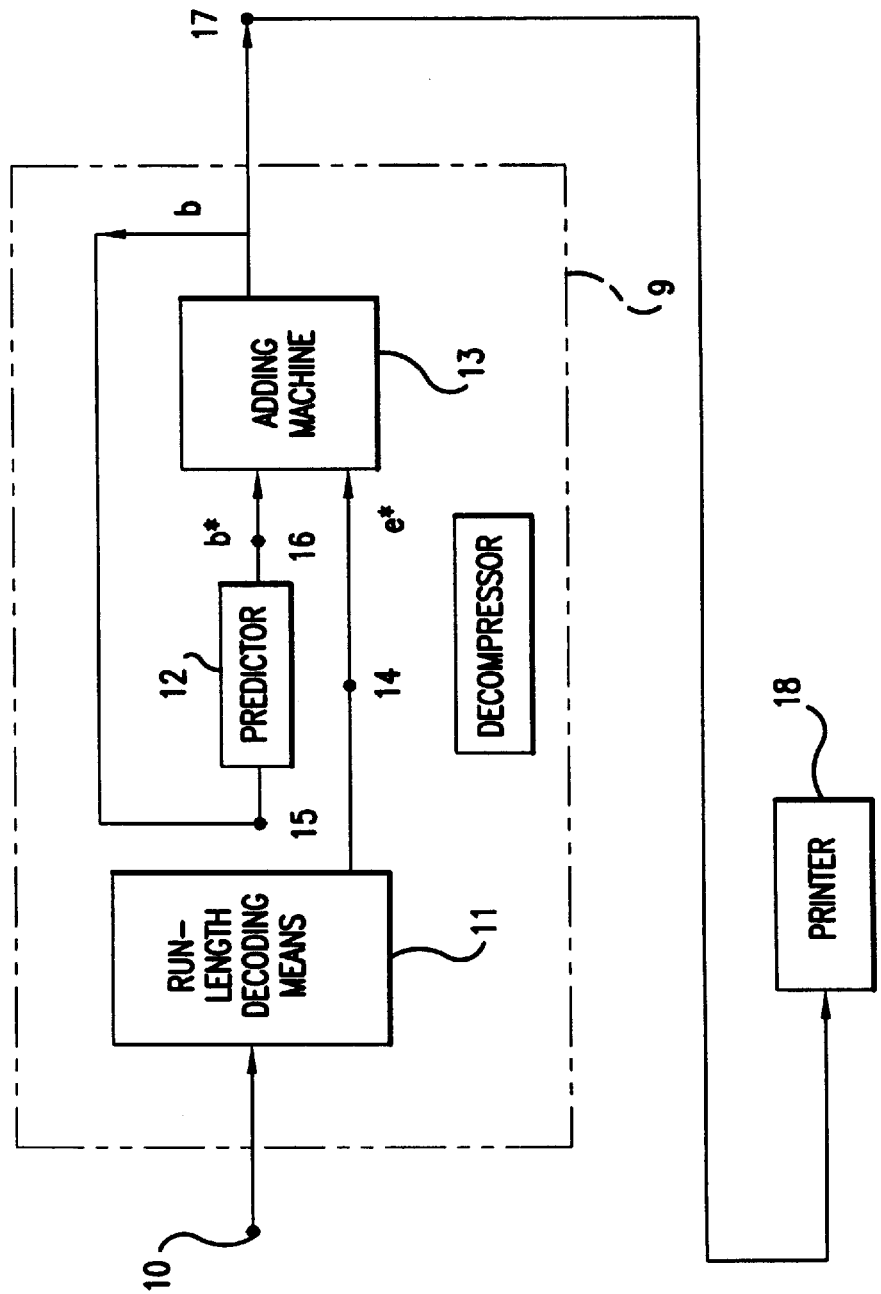
FIG. 3 shows a block diagram of an illustrative apparatus using an inventive decompression method of an embodiment of the invention.

FIG. 3 depicts a block diagram of an apparatus according to one embodiment of the invention which receives, decodes and decompresses the run length encoded image transmitted or otherwise sent from the apparatus shown in FIG. 1.

As shown in FIG. 3, a decompressor 9 comprises run length decoding means or decoder 11, predictive coding circuitry or receiver predictor 12 and addition means or circuitry 13.

The run length decoder 11 decodes run length encoded prediction errors input from point 10 and outputs a plurality of prediction errors at point 14.

Prediction circuitry 12 inputs at point 15 past decoded signals output from addition circuitry 13 and outputs a plurality of predicted signals at point 16. These predicted signals are calculated within the prediction circuitry 12 by quantizing a predicted modified signal, $i^*_{mod}$. This signal, i.e., $i^*_{mod}$, is in turn first calculated by circuitry preferably a part of the prediction circuitry from an average of past decoded signals over a "neighborhood" and previous receiver quantization errors which are stored in receiver memory or storage (not shown in FIG. 3) in the same manner as in equations (1) and (2). The receiver memory or storage may be a part of, or separate from, the decompressor 9.

The predicted signals from point 16 and prediction errors from point 14 are thereafter input into the addition circuitry 13 which adds the two signals together. In this manner, each predicted signal from the prediction circuitry 12 is added to each decoded prediction error from the run length decoder 11. As in the compressor 2, if at any point no prediction error is present, then the predicted signal is output as the decoded signal from the addition circuitry 13 to form an image at point 17. If an error exists, the corresponding predicted, modified signal is adjusted in the same manner as in equation (4).

A decoded image can be output to a printer 18 or other reproducing apparatus. Each decoded signal is generated from each addition of a predicted signal and a decoded prediction error.

In order to decode and correctly predict the next image or signal a present receiver quantization error is calculated within the decompressor 9. This error is then stored in the receiver memory.

Figure 4A:
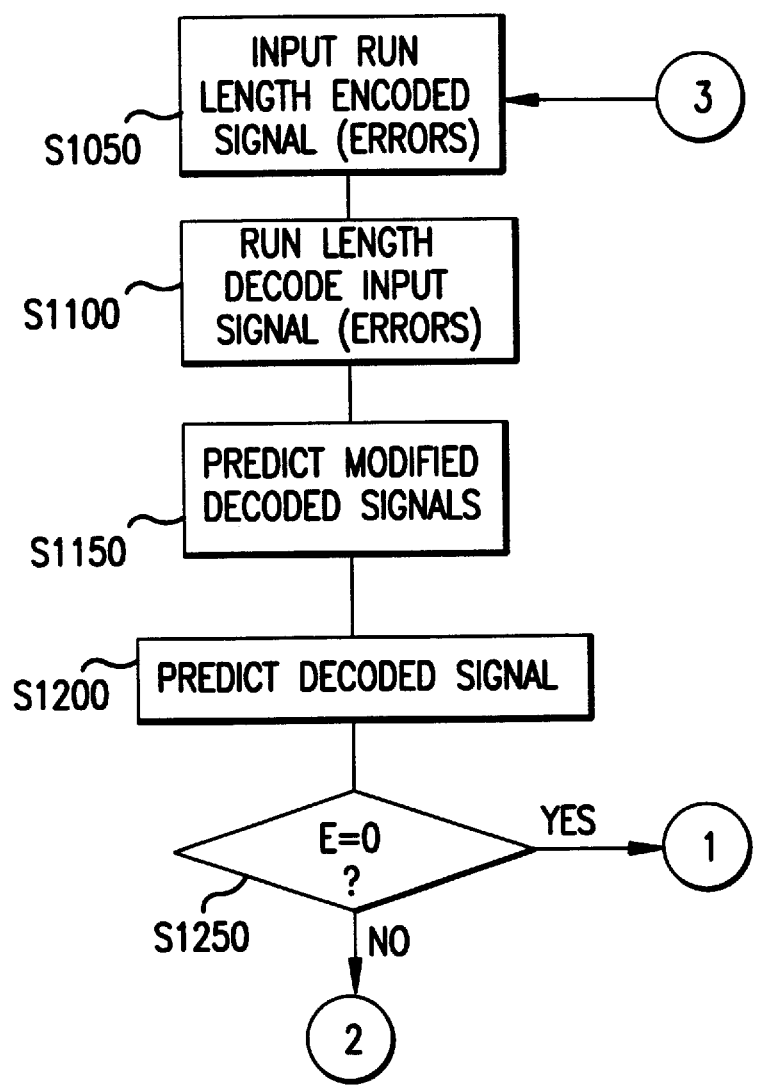
FIGS. 4(A), (B) and (C) are flow charts relating to an illustrative decompression method of an embodiment of the present invention.
Figure 4C:
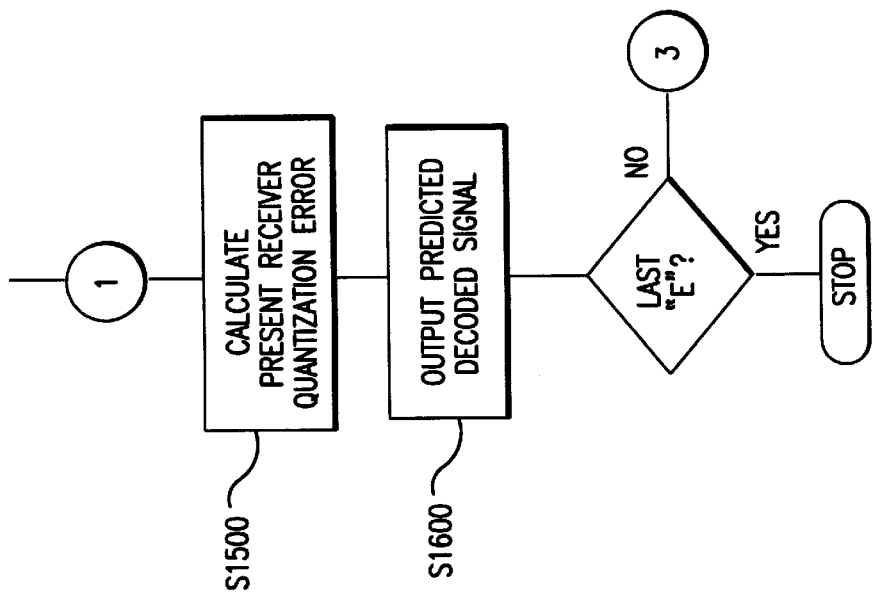
Figure 4B:
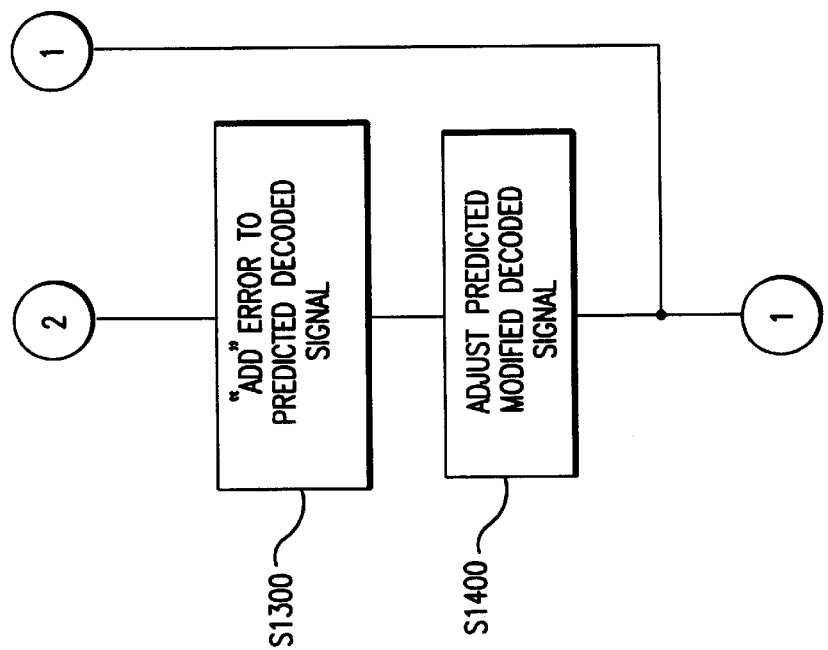

Similarly, FIGS. 4(A), (B) and (C) are flow charts depicting the decompressing operation of the illustrative apparatus shown in FIG. 3. The operative steps of the decompressor (S1050 to S1600) are analogous to the operation of the compressor with the exception that in step S1200 a decoded output b'(m,n) is first calculated from a decoded error as follows:

$$b'(m,n)=E(m,n)+b^*(m,n)$$

The invention has been described with reference to a particular embodiment. Modifications and alterations will occur to others upon reading and understanding this specification. It is intended that all such modifications and alterations are included insofar as they come within the scope of the appending claims or equivalents thereof.

What is claimed is:

1. A method for lossless efficient run-length encoding of error diffused halftone images, comprising:

inputting an error diffused halftone digital signal;

generating a predicted continuous tone signal from previous error diffused halftone digital signals;

generating a predicted error diffused halftone digital signal from the predicted continuous tone signal;

generating a prediction error signal from the error diffused halftone digital signal and the predicted error diffused halftone digital signal; and run length encoding the prediction error signal.

2. The method of claim 1, wherein the step of generating a predicted continuous tone signal comprises averaging a plurality of portions of previous error diffused halftone digital signals.

3. The method of claim 2, wherein the step of generating a predicted continuous tone signal comprises;

averaging previous error diffused signals;

determining a weighted sum of previous prediction error signals; and summing the average of previous error diffused signals and the weighted sum of previous prediction error signals.

4. The method of claim 3, further comprising adjusting the predicted continuous tone signal based on the prediction error signal.

5. The method of claim 4, wherein the adjusting step comprises:

replacing the predicted continuous tone signal with a minimum value of a corresponding portion of the error diffused halftone digital signal when the prediction error signal is greater than zero;

replacing the predicted continuous tone signal with a maximum value of the corresponding portion of the error diffused halftone digital signal if the prediction error signal is less than zero; and foregoing adjusting the predicted continuous tone signal when the prediction error signal is equal to zero.

6. The method of claim 4, further comprising storing the averaged error diffused halftone digital signal and the prediction error signal.

7. A method for lossless decompression of a run-length encoded signal, comprising:

inputting a run-length encoded prediction error signal;

run length decoding the run-length encoded prediction error signal to form a prediction error signal;

generating a decoded digital signal from the prediction error signal and a predicted digital signal;

generating a predicted continuous tone signal from previous decoded digital signals; and generating the predicted digital signal from the predicted continuous tone signal.

8. The method of claim 7, wherein the step of generating the predicted continuous tone signal comprises averaging a plurality of portions of previous decoded digital signals.

9. The method of claim 7, wherein the step of generating the predicted continuous tone signal comprises:

averaging previous decoded digital signals;

determining a weighted sum of previous prediction error signals; and summing the average of previous decoded digital signals and the weighted sum of previous prediction error signals.

10. The method of claim 9, further comprising adjusting the predicted continuous tone signal based on the prediction error signal.

11. The method of claim 10, wherein the adjusting step comprises:

replacing the predicted continuous tone signal with a minimum value of a corresponding portion of the decoded digital signal when the prediction error signal is greater than zero;

replacing the predicted continuous tone signal with a maximum value of a corresponding portion of the decoded digital signal when the prediction error signal is less than zero; and foregoing adjusting the predicted continuous tone signal when the prediction error signal is equal to zero.

12. The method of claim 10, further comprising storing the averaged decoded digital signal and the predicted error signal.

13. An apparatus for lossless compression of an error diffused halftone digital signal, comprising:

a prediction circuit which inputs the error diffused halftone digital signal and outputs a predicted digital signal, comprising:

an averaging circuit which averages a plurality of portions of previous error diffused halftone digital signals and outputs a predicted continuous tone signal, and a predicted digital signal generator circuit which inputs the predicted continuous tone image signal and outputs the predicted signal;

a prediction error circuit which inputs the error diffused halftone digital signal and the predicted digital signal and outputs a prediction error signal; and a run length encoder which inputs the prediction error signal and outputs a run length encoded prediction error signal.

* * * * *